United States Patent [19]

Siemann

[11] Patent Number: 4,830,219
[45] Date of Patent: May 16, 1989

[54] APPARATUS FOR PREPARING AND DISPENSING THERMOPLASTIC RESIN

[75] Inventor: Bernd Siemann, St. Augustin, Fed. Rep. of Germany

[73] Assignee: Nordson Corporation, Westlake, Ohio

[21] Appl. No.: 896,658

[22] Filed: Aug. 13, 1986

Related U.S. Application Data

[62] Division of Ser. No. 653,684, Sep. 21, 1984, Pat. No. 4,667,852.

[51] Int. Cl.$^4$ .............................................. B67D 5/08
[52] U.S. Cl. ..................................... 222/55; 264/40.7; 425/135
[58] Field of Search ................ 222/55, 63, 52, 54, 222/413, 146.1, 146.2, 61; 425/71, 135, 144, 145; 264/40.1, 40.3, 40.6, 40.7

[56] References Cited

U.S. PATENT DOCUMENTS

| | | | |
|---|---|---|---|
| 3,028,833 | 4/1962 | Hummel | 118/7 |
| 3,148,231 | 9/1964 | Spencer | 264/40.7 |
| 3,759,648 | 9/1973 | Hunkar | 264/40.7 |
| 3,764,043 | 10/1973 | Wright | 222/55 |
| 4,088,430 | 5/1978 | Giles | 425/144 |
| 4,102,958 | 7/1978 | Wertz | 264/40.6 |
| 4,146,601 | 3/1979 | Bishop | 264/40.1 |
| 4,178,337 | 12/1979 | Hall et al. | 264/28 |
| 4,249,876 | 2/1981 | Strausfeld et al. | 425/145 |
| 4,307,760 | 12/1981 | Hauser | 222/55 |
| 4,395,217 | 7/1983 | Benadi | 425/382 R |
| 4,478,775 | 10/1984 | Endo et al. | 264/40.3 |
| 4,500,481 | 2/1985 | Marx, III | 264/40.6 |
| 4,530,605 | 7/1985 | Eichlseder et al. | 366/79 |
| 4,545,504 | 10/1985 | Fabel | 222/55 |

FOREIGN PATENT DOCUMENTS 2054615 3/1972 Fed. Rep. of Germany .
58-108120 6/1983 Japan .

OTHER PUBLICATIONS

Plastics Extrusion Technology and Theory, pp. 203-205.

Primary Examiner—Joseph J. Rolla
Assistant Examiner—Kenneth Noland
Attorney, Agent, or Firm—Wood, Herron & Evans

[57] ABSTRACT

Apparatus for preparing and dispensing thermoplastic resin has a conveyor with a chamber provided with heating elements, a conveyor screw mounted in the chamber and connected to a drive motor, a resin inlet and a resin outlet. To ensure the intended continuous dispensing of the resin even during intermittent operation, a control device is provided having inputs connected to a resin pressure sensor, a conveyor speed of rotation sensor and a resin temperature sensor. Intended values for the conveyor speed, resin pressure and resin temperature are supplied to the control device, which regulates the pressure during interruption of the dispensing of the resin and effects a speed regulation or a pressure regulation with a superimposed speed regulation during dispensing of the resin. For plasticizing of the resin, which is supplied in solid, preferably granular form, and since the conveyor geometry is designed to produce minimum friction, external heating by the heating elements is required. The temperature at the outlet is monitored by the temperature sensor and regulated by the control device.

1 Claim, 3 Drawing Sheets

FIG. I

APPARATUS FOR PREPARING AND DISPENSING THERMOPLASTIC RESIN

This is a division, of application Ser. No. 653,684, filed Sept. 21, 1984, now U.S. Pat. No. 4,667,852, granted May 26, 1987.

The present invention relates to apparatus for preparing and dispensing thermoplastic resin by means of a conveyor including a conveyor screw.

In prior art apparatuses of this type, thermoplastic resin is supplied in a solid, suitably granular, condition through a filling funnel into the conveyor, in which it is mixed, coloured or compounded and, if required, treated with inert gases to foam it, plastizied by the effect of the friction of the screw of the conveyor and, if required, by additional heat applied by a heating device, and delivered through an outlet in a dosed form.

Exact dosing, however, has been found to be very difficult, particularly during intermittent operation, since the supply of granular thermoplastic resins can occur in different doses, a certain starting period is required for reaching the intended dispensing amount per unit of time after an interruption of the dispensing of the thermoplastic resin and the viscosity of the thermoplastic resin is dependent on the material properties of the thermoplastic resin, i.e., on the type of thermoplastic resin and, for a given type, on the charge, the moisture content and, to a substantial extent, the temperature.

The temperatures within the conveyor, however, vary very rapidly, since the conveyor, running rapidly during the dispensing of resin, produces more frictional heat than s the case in which it remains stationary, or rotates slowly, during interruption of the dispensing of the thermoplastic resin.

U.S. Pat. No. 3,028,833 discloses an apparatus for preparing and dispensing a thermoplastic resin in which, at the outlet, a chamber is provided which is connected through a boring to a resin applicator wheel. Thermoplastic resin is supplied by the conveyor screw into the chamber when the pressure in the chamber falls below a predetermined value. Thereby, the pressure in the chamber constantly varies between a lower value and an upper value, which, due to the application of the resin on the resin applicator wheel in this prior art apparatus, does not have a negative effect. However, if the resin is taken directly from the outlet and applied, this constant pressure variation leads to a variation in the amounts of resin applied. Furthermore, the heating device surrounding the chamber containing the conveyor screw in this case supplies a constant amount of heat to the resin, so that the temperature of the resin varies in the above-described manner.

German Patent Application (OLS) No. 3,109,303, discloses a conveyor for viscous substances in which the pressure of the viscous substance being conveyed is measured at the outlet and a drive for the conveyor screw is regulated in accordance with this pressure. If such an apparatus is employed for thermoplastic resin, the problem arises that, firstly, the thermoplastic resin does not act as an ideal Newton liquid and is partly compressible and has a shear gradient, and that, secondly, during such regulation in accordance with only the pressure there is a large dependence on the momentary viscosity of the thermoplastic resin. In addition, however, the dispensing amount is to a large extent dependent on the temperature, the type of the granular material, the specific charge of a particular granular material, the moisture content and the like.

From the above discussion it will be clear that, for regulating a constant volume or mass flow of the thermoplastic resin, the speed of rotation of the conveyor screw or the drive device of the conveyor screw and the pressure at the outlet for the thermoplastic resin can be used as a regulating parameters only on the assumption that the viscosity is constant and that the supply or feed of the granular thermoplastic resin is effected uniformly In the case, in particular, of regulation in accordance with the pressure only, mass flow depends substantially on the viscosity of the relevant thermoplastic resin.

It is accordingly an object of the present invention to provide an apparatus for preparing and dispensing a thermoplastic resin, which improves the accuracy of the dosage of the amount of the thermoplastic resin delivered per unit of time even during intermittent or discontinuous operation.

According to the present invention, there is provided apparatus for preparing and dispensing thermoplastic resin, such as a heat meltable adhesive, comprising a conveyor having a chamber, a heating device associated with the chamber a conveyor screw mounted for rotation within the chamber drive means for effecting the rotation of the conveyor screw, an inlet for the supply of the resin to the chamber and an outlet for delivering the resin in a liquid condition, and control and regulating means connected to the conveyor for controlling the dispensing of the resin from the outlet, the control and regulating means having inlets connected to pressure measurement means for measuring the pressure within the chamber of the conveyor, to means for measuring the dispensing amount per unit time of the thermoplastic resin, to means for providing an input signal corresponding to an intended value for the pressure and to means for providing an input signal corresponding to an intended value for said dispensing amount, the control and regulating means comprising means for providing an output to so control the drive means that, during dispensing of the resin, the amount dispersed per unit of time assumes a first predetermined value and, during interruption of the dispensing of the resin, the pressure of the resin within the chamber assumes a second predetermined value.

The apparatus according to the invention may be arranged to provide an optimal control and regulation of the mass or volume flow of the thermoplastic resin during intermittent operation, taking into account substantially varying viscosities. While the control and regulation is changed over, during interruption of the delivery, to a pressure regulation, in order to maintain a minimum pressure, so that the dead time during the subsequently renewed dispensing of the thermoplastic resin is reduced, during the dispensing a speed or mass flow regulation adapted to the viscosity of the relevant thermoplastic resin is effected. While with prior art devices the delay period after interruption of the delivery until restoration of the required flow pressure requires about 10 to 20 seconds, this delay period may amount to only a few milliseconds with apparatus embodying the present invention.

In an advantageous embodiment of the invention, the control and regulating means comprise means for superimposing the regulation of the speed of rotation of the drive means of the conveyor screw on the regulation of the pressure in the chamber of the conveyor during the dispensing of the resin. If the intended value of the mass or volume of flow per unit of time is reached, which corresponds to the corresponding pressure during the interruption of the dispensing of the thermoplastic resin, then the speed of rotation is regulated to a constant value.

Due to the combined pressure and speed of rotation or mass or volume flow regulation, furthermore, the mass flow, which due to material irregularities or different material feed amounts pulsed in prior art devices, is constant and is regulated to a predetermined value even for different materials. Thus, the combined pressure and speed regulation offers the advantage that the standard speed regulating devices provided i electrical drive motors can be employed and can be adopted even for discontinuous operation. Additionally, a constant mass or volume flow is ensured even for different materials or, with the same materials, for different viscosities due to different charges and different moisture contents or temperatures.

BRIEF DESCRIPTION OF THE DRAWINGS

The invention will be more readily understood from the following description of preferred embodiments thereof given, by way of example, with reference to the accompanying drawings, in which.

DETAILED DESCRIPTION OF THE DRAWINGS

Figure 1:
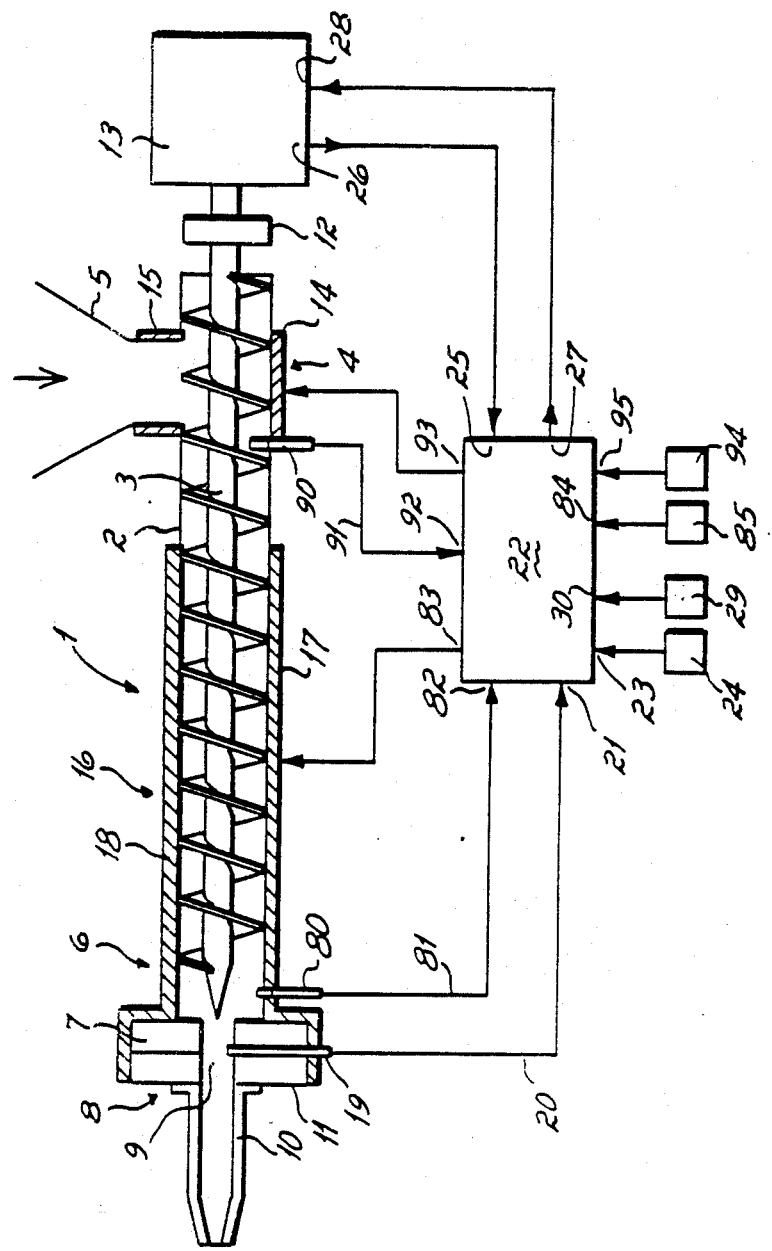
FIG. 1 shows a diagrammatic illustration of an apparatus for preparing and dispensing thermoplastic resin with a conveyor and a control and regulating device for regulating the pressure and the speed of rotation.

The apparatus illustrated in FIG. 1 comprises a conveyor 1 in the form of an extruder having a conveyor screw 3 rotatable in a cylindrical chamber 2. The outer diameter of the conveyor 3 corresponds substantially to the inner diameter of the chamber 2. At the inlet end 4 of the conveyor 1, the chamber 2 is connected to a filling funnel 5 for receiving the usually granular thermoplastic resin. At the outlet end 6 of the conveyor 1, the front of the chamber 2 is connected through a cap 7 with an outlet 8.

The outlet 8 has a central opening or passage 9 to which one or more nozzles 10 are connected at a front face 11 of the cap 7 directed away from the chamber 2. The orifice each nozzle 10 communicates with the central opening 9 and, through a respective pipe or hose, with a respective applicator for applying the thermoplastic resin.

At the inlet end 4 of the chamber 2, the conveyor screw 3 is connected, through a coupling device 12, with a drive motor 13. Additionally, in the vicinity of the inlet end 4, the chamber 2 and the filling funnel 5 are provided with an intake cooling arrangement in the form of cooling sleeves 14 and 15. At the outlet end 6 and a region 16 adjacent the outlet end 6, the chamber 2 and the cap 7 are provided with one or more heating devices in the form of heating elements 17 and 18, which extend around the outer peripheral surfaces of the chamber 2 and the cap 7.

At the outlet end 6 of the conveyor 1, there is provided within the cap 7 a pressure measuring device 19, the output of which is connected by a conductor 20 to a first input 21 of a control and regulating device 22. The pressure measuring device 19 is so arranged that it determines the pressure of the thermoplastic resin in the vicinity of the central opening 9.

Instead of being provided in the cap 7, the pressure probe 19 can be provided within the chamber 2 directly at the end of the chamber 2 before the cap 7 or in the nozzle 10. It is also possible to provide a plurality of pressure measuring devices in different positions in the chamber 2.

A second inlet 23 of the control and regulating device 22 is connected to an input device for inputting an intended or target value for the resin pressure. Through a third input 25, the control and regulating device 22 is connected to an output 26 of the drive motor 13 for dispensing the actual value of the speed of rotation. Through a fourth input 30, the control and regulating device 22 is connected to an input device 29 for providing a signal corresponding to an intended speed of rotation of the conveyor drive motor 13, while a first output 27 of the control and regulating device 22 is connected to a control input 28 of the drive motor 13 for controlling the speed or angle of rotation of the drive motor 13.

At the outlet end 6 of the conveyor 1, within the chamber 2, and suitably at the end of the chamber 2 immediately before the cap 7 or even in the cap 7, there is provided a temperature sensor 80 which is so arranged that it can determine the temperature of the thermoplastic resin at the outlet end of the chamber 2 or in the central opening 9. The output of the temperature sensor 80 is connected through a conductor 81 to a fifth input 82 of the control and regulating device 22, a second output 83 of which controls the heating elements 17 and 18.

Through a sixth input 84, the control and regulating device is connected to an input device 85 for providing a signal representing the intended value of a first temperature by which the intended temperature of the thermoplastic resin at the end of the conveyor 1 is adjustable, so that the heating elements 17 and 18 can be so controlled by the control and regulating device 22 that the predetermined intended temperature can be maintained at the end of the chamber 2.

Furthermore, the control and regulating device 22 is connected through a seventh input 92 and a conductor 91 to a second temperature sensor 90 in the vicinity of the intake cooling arrangement and, by an output 93, so controls the cooling sleeves 14 and 15 that a predetermined temperature value is not exceeded in the vicinity of the inlet end 4 of the conveyor 1. A corresponding second intended temperature signal for the region of the intake cooling arrangement is provided by an input device 94 connected to the eighth input 95 of the control and regulating device 22.

The manner of operation of the above-described embodiment of the present invention and the regulation of the dispensing amount in continuous, discontinuous or intermittent operation will now be described in greater detail.

The mass or volume flow at the outlet end 8 occurs in accordance with the following equation:

$$v \text{ or } m = d \times p \times F(M, f, C, T)$$

In this equation, v represents the volume flow, m represents the mass flow, d represents the diameter of the central opening 9, p represents the pressure in the central opening 9 measured by the pressure measurement device 19 and F represents a factor taking into account the viscosity of the thermoplastic resin, which is dependent on the material properties (M) of the thermoplastic resin employed, the moisture content (f), the charge employed (C) and the temperature (T).

In operation, thermoplastic resin, preferably in granular form, is supplied through the filling funnel 5 to the conveyor and fed by the conveyor screw 3 to the outlet end 6. The cooling sleeves 14 and 15 provided at the inlet end prevent premature plasticizing of the thermoplastic resin. During the feeding by the conveyor screw 3, the thermoplastic resin is compressed, for example, by providing the conveyor screw with a shaft the diameter of which increases towards the outlet end whereby by the frictional heat occurring during the feeding and, additionally, by the heat supplied by the heating elements 17 and 18 the thermoplastic resin is heated and finally plasticized. In order to make available a sufficient area for the transfer of heat from the heating elements 17 and 18, the chamber 2 is preferably made very elongate. The length/diameter ratio of the conveyor screw is of the order of 20 to 40, preferably 25 to 30. Thus, the thermoplastic resin at the outlet end 6 or at the outlet 8 is in plasticized form or in a melted condition under a certain, pressure, which essentially is a function of the speed of rotation of the conveyor screw 3 and the viscosity, which is determined by the temperature of the thermoplastic resin.

The pressure of the thermoplastic resin at the output end 6 is determined by the pressure measurement device 19 and an actual value signal, corresponding to the measured pressure, is supplied to the control and regulating device 22. This signal is, in the usual way, compared with the intended pressure value provided at the second input 23 and the speed of rotation of the drive motor 13 is correspondingly adjusted, in dependence on the difference thus determined, through the speed of rotation input 28. From the actual value output 26 of the drive motor 13, the signal representing the actual value of the speed of rotation is supplied to the control and regulating device 22.

If the speed of rotation of the conveyor screw 3 set by the control and regulating device 22 varies due to different dispensed amounts, then a different mass or volume flow of the thermoplastic resin from the conveyor screw 3 through the heating zone past the heating elements 17 and 18 occurs. For an initially constant heat supply, the temperature sensed by the temperature sensor 80 therefore varies. For example, for an increased throughput the temperature detected by the temperature sensor 80 falls if the heat supply remains constant. Simultaneously, it is true, the friction increases as a consequence of the increased speed of rotation of the drive motor 13, but this cannot compensate the temperature fall. This temperature alteration is indicated by the temperature sensor 80 as a corresponding temperature actual value signal to the control and regulating device 22. The latter detects a difference between the actual value signal and the intended value signal provided through the input 84 and controls the power supplied to the heating elements 17 and 18 so that this temperature difference is reduced to zero or so that the temperature detected by the temperature sensor 80 is made equal to the predetermined intended value.

Thus by the temperature regulation, the temperature at the dispensing position 8 is kept constant independently of the speed of rotation of the conveyor screw 3 and the heat applied by friction and of the changing throughput of the thermoplastic resin.

Discontinuous or interrupted operation of the apparatus, in which for a certain period a constant dispensing amount per unit of time is supplied, then after the expiry of this period the dispensing is interrupted for a pause period and in which, after expiry of this pause period, the mass flow of the thermoplastic resin should again be delivered as constantly as possible presents a problem. While during the continuous dispensing of thermoplastic resin regulation of the speed of rotation of the drive motor 13 on the basis of the pressure, which is dependent on the speed of rotation, is sufficient, the speed of rotation control is found to be impracticable during intermittent operation, i.e. during temporary interruption of the delivery. For the above mentioned reasons, however, regulation of the pressure only is insufficient because of the strong dependence of the pressure in the chamber 2 on the viscosity. The present combination of pressure regulator and speed of rotation regulation provides assistance in the connection, a regulation of the speed of rotation of the drive motor 13 being effected during the dispensing and, during interruption of the delivery, the pressure being regulated, suitably in the region of the dispensing point 8.

By the pressure regulation during the interruption of the delivery, a predetermined pressure is maintained at the outlet by which it is ensured that, for compensating pressure losses, the conveyor screw 3 is further rotated through certain angular amounts of the drive motor 13, even during interruption of the dispensing, and thus equalizes the pressure drop. Immediately after resumption of the dispensing the control and regulating device 22 changes over to regulation of the speed of rotation or effects a pressure regulation wit a superimposed speed of rotation regulation. In this way, different material inputs in the region of the supply funnel 5 are equalized and, simultaneously, the high viscosity dependency of the regulation of only the pressure is compensated.

Even when the resin is delivered at a high rate from the outlet immediately following an interruption, a constant mass flow of the thermoplastic resin can be ensured, a requirement for fast regulation being a correspondingly fast drive motor 13, which must be capable during the pause or interruption period, of effecting gradual conveyor screw rotations for compensating the pressure losses and, during rapidly increasing delivery, of applying the required torque to accelerate or correspondingly fastly rotate the conveyor screw 3.

Figure 2:
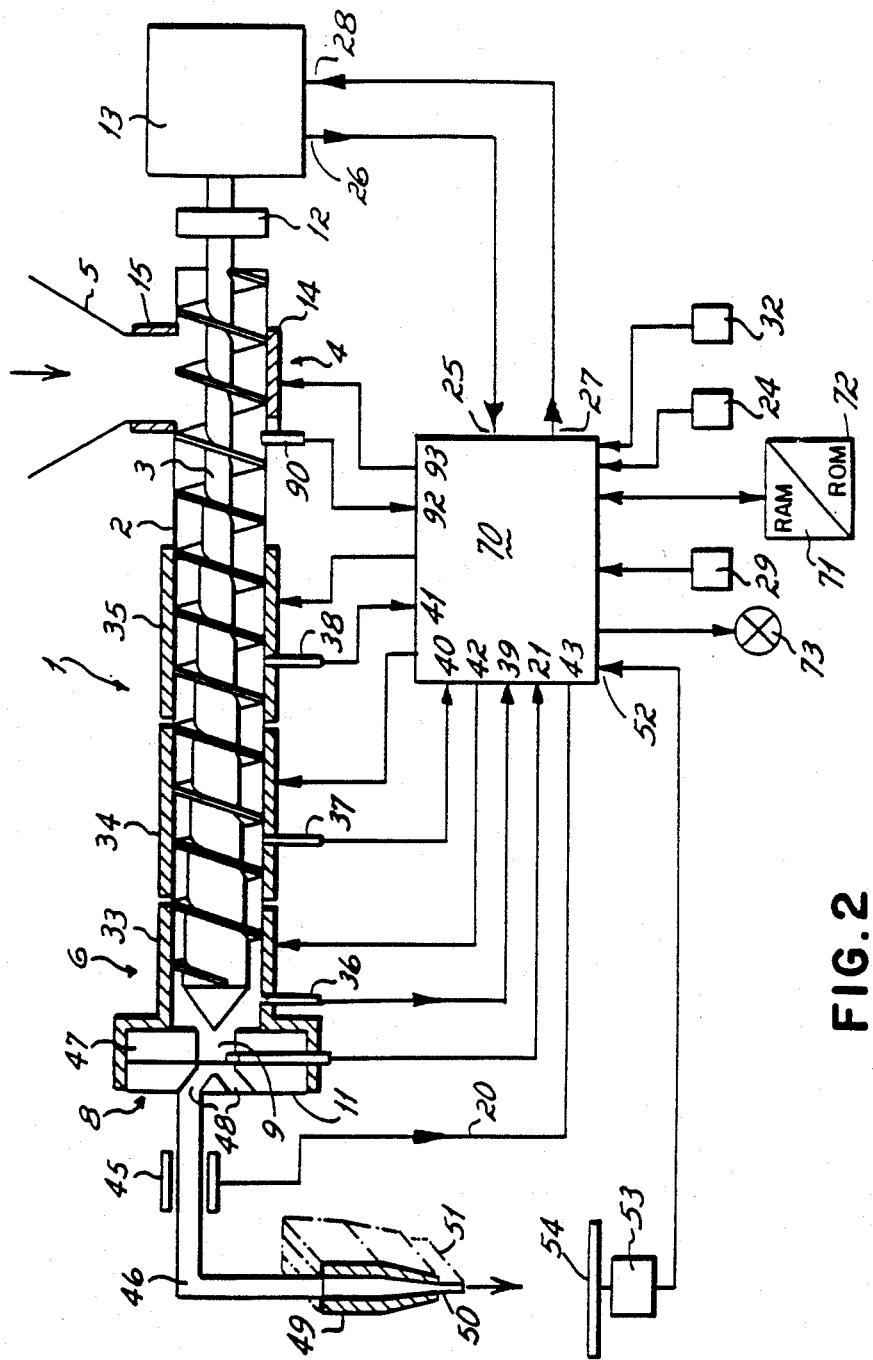
FIG. 2 shows a diagrammatic illustration of a modification of the apparatus of FIG. 1 provided with a processor for controlling and regulating the conveyor.

Since the temperature regulation of the embodiment of FIG. 1 occurs after a certain time delay, and thus allows a certain variation from the intended value, the embodiment shown in FIG. 2 has the improvement that the heating section of the chamber 2 is provided with a plurality of heating elements 33, 34 and 35, which are arranged in succession along the length of the chamber 2. In each region of the chamber 2 provided with a respective heating element 33, 34 and 35, there is provided a respective temperature sensor 36, 37 and 38, these temperature sensors being connected to respective inputs 39, 40 and 41 of the control and regulating device.

The control and regulating device comprises, in this embodiment, a microprocessor 70 which is capable of processing the multiplicity of data and of supplying, in accordance with a predetermined program, corresponding control signals to the heating elements 33, 34 and 35, the drive motor 13 and the cooling devices 14 and 15.

As shown in FIG. 2, the microprocessor 70 is connected at its inputs to a measuring device 45 for determining the volume or mass flow of the dispensed thermoplastic resin, to the temperature sensors 36, 37 and 38 associated with respective heating zones, to a temperature sensor 90 associated with the cooling zone, to an output 26, which provides a signal representing the speed of rotation of the drive motor 13, to an input device 29 for providing a signal representing the intended value of the pressure, and to input devices 24 and 32 for providing signals representing intended values of the speed of rotation and the temperature, respectively, the input device 32 providing separate intended temperature signals for the heating elements 33, 34 and 35 and the intended values for the cooling elements 14 and 15. Furthermore, the microprocessor 70 is provided with a random access memory 71 and with a read only memory 72 and has an output connected to an indicator, preferably a light-emitting diode device 73.

By the division of the heat zones, it is possible, by altering the speed of rotation of the conveyor screw 3, to rapidly produce an altered throughput and to rapidly adjust the power supply to the individual heater elements 33, 34 and 35, which is required for obtaining a constant output temperature, so that temperature variations at the output end can be kept negligibly small.

The apparatus for preparing and dispensing thermoplastic resin which is diagrammatically illustrated in FIG. 2 has, in contrast to the apparatus of FIG. 1, alternatively or additionally a device 45 for directly determining the volume or mass flow of the thermoplastic resin delivered by the apparatus. This device, which can, for example, be constructed as an ultrasonic measuring device, produces a signal corresponding to the measured volume or mass flow and supplies this signal over a conductor 20 to a further input 43 of the microprocessor 70.

Thus, the determination of the amount of thermoplastic resin delivered by the apparatus can be effected either by a pressure measurement and/or by determining the speed of rotation or the angle or speed of the conveyor screw or the drive motor and/or by determining the volume or mass flow of the thermoplastic resin delivered by the apparatus. In intermittent operation, however, it is necessary, in order to ensure regulation with the shortest possible dead time, to measure the pressure at the dispensing outlet, upon interruption of the dispensing of the thermoplastic resin, and to supply it as an actual value signal to the microprocessor 70, so that on subsequent resumption of the delivery, the required flow pressure is ensured. Due to the above-mentioned dependencies of the measured pressure in the chamber during the dispensing of the thermoplastic resin, however, in order to increase the accuracy of the regulation it is necessary to superimpose on the pressure regulation a speed or speed of rotation regulation of the conveyor screw 3 or the drive motor 13 or on a volume or mass flow measurement.

Figure 3:
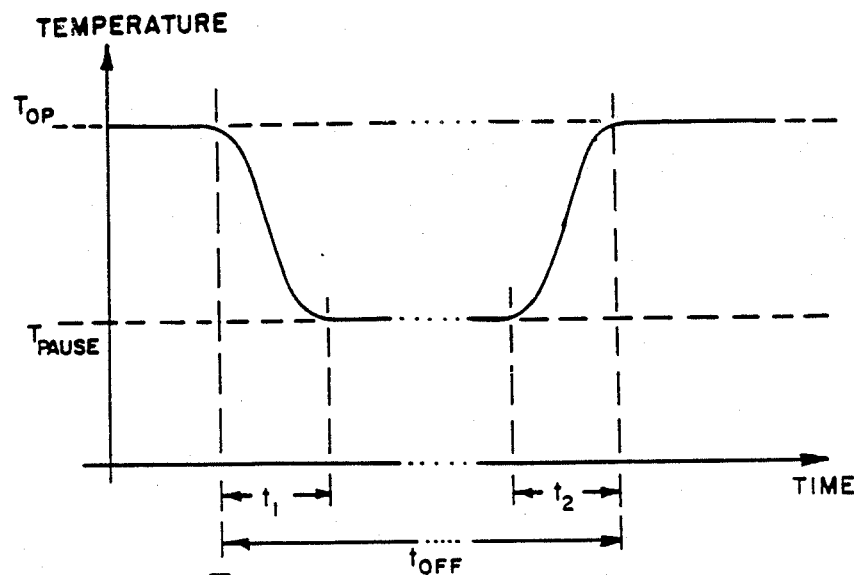
FIG. 3 shows a timing diagram of the temperature intended value over the period of an interruption of the operation of the apparatus.

By connecting the microprocessor 70 to a program source or a controller or the RAM 71 and/or the ROM 72 it is possible to employ a program to provide the intended values during intermittent or discontinuous operation of the apparatus. Thus, for example, it is possible, in order to prepare for the interruption of the dispensing of the thermoplastic resin during reoccuring pause periods, to reduce the temperature, as shown in FIG. 3, over a time span $t_1$ to a pause temperature $T_{PAUSE}$, and to raise it at a time span $t_2$, before renewed dispensing of the thermoplastic resin, to the operational temperature $T_{OP}$.

In addition to such programmed interruption of the operational phase, it is possible, during a quasi-continuous or intermittent operation with periodic dispensing and interruption periods, to carry out an external, superimposed program control. For this purpose, the ROM 71 or the RAM 72 can selectively be programmed with an operational sequence which provides corresponding intended values for the temperature, the pressure, the speed of rotation, or the volume or mass flow. Likewise, a known adaptive regulation with trend analysis and forward display operation can be utilized.

By coordinated regulation of the individual heat zones, the four types of operation "continuous stoppage", "continuous running", "changeover from stoppage to running" and "changeover from running to stoppage" can be so regulated that the dead times occurring in the regulation are made as short as possible. In this way, the adaptation time can be minimized and a power surplus in the apparatus in the stationary condition, i.e. on interruption of the delivery, with the associated danger of burning of the thermoplastic resin, and a lack of power on subsequent dispensing of the thermoplastic resin, are avoided.

In the embodiment illustrated in FIG. 2, the device for determining the volume or mass flow 45 is provided exteriorly of the conveyor 1 in association with a connecting member 46, which is formed as a rigid or flexible conduit and which, at its end adjacent the conveyor, is connected to a distributor 47 provided in place of the cap 7. The distributor 47 has, adjacent the hollow space defined by the chamber 2, a central opening 9 which is co-axial with the chamber 2 and the conveyor screw 3 and a plurality of dispensing passages 48 extending therefrom, which terminate in a front face 11 of the distributor facing away from the chamber 2 and which are there connected to respective connection members, of which only the connection member 46 is shown. The illustrated connection member 46 is provided at its free end with an applicator or tool 49 formed as a nozzle, which has an opening 50 for the outflow of the thermoplastic resin. One or more of such connecting members 46 and tools 49 may be provided, each connected to a respective dispensing passage 48.

The further, the device for determining the volume or mass flow or pressure measuring device 19, provided as an alternative thereto, is separated from the conveyor 1, the more must the time delay required for the regulation be taken into account. This is effected by incorporating a corresponding regulation function in the programming of the microprocessor 70.

The drive motor 13 may in principle comprise any direct current or alternating current motor or may comprise an hydraulic or pneumatic motor. Since, however, because of the above-mentioned criticalities it is required to provide a regulation which is as fast as possible, it is recommended, in order to keep the time delays in the regulation as short as possible, to employ a disc rotor motor with an iron-free armature disc and a permanent magnet excitation as the feed and adjustment drive. Such a disc rotor motor has a disc-shape armature of epoxide resin with, depending on the motor type, 4 to 8 copper laminae, which are insulated from one another and which are formed with stamped conductor lugs, which by appropriate welding of the ends thereof form a winding. Carbon brushes arranged axially thereof provide current flow directly to the conductor lugs, so that the conductor lugs serve both as the winding and as the comutator. The excitation field of such a disc rotor motor is produced by a plurality of opposed permanent magnet pairs, which comprise a cast alloy having components of aluminum, nickel and cobalt, for example, AlNiCo. When the disc rotor motor is provided with a direct current, due to the conductor arrangement the applied direct current, flows in the radial direction. Since the magnetic field is perpendicular to the rotor disc, an electromotive force is exerted on the rotor disc, whereby a torque is exerted on the motor shaft. Such a disc rotor motor is characterized by a low moment of inertia and in addition by very small mechanical time constants, brief, high pulse currents or pulse torques for acceleration and braking, high speed stability and uniform rotation down to crawl speeds below 0.5 rotations per minute.

In addition to a delay-free measurement data determination and processing by means of the microprocessor 70, therefore, an optimal regulation, in particular for intermittent operation of the apparatus for preparing and dispensing thermoplastic resin, is ensured.

Directly associated with the fastest possible regulation, even for intermittent operation, there is provided a specially constructed geometry of the conveyor screw 3, which must on the one hand ensure that the amount of air, which is about 40%, contained in the granular mixture of the solid thermoplastic resin is expelled and that, on the other hand, the danger of jamming of the conveyor screw 3 due to a too high compression is avoided. Furthermore, the screw geometry should ensure that the smallest possible friction is maintained in order to keep the cooling in the vicinity of the intake as small as possible.

The compression required for plasticizing the thermoplastic resin depends on the particle size of the thermoplastic resin as supplied in granular form and on the material properties of the thermoplastic resin. To ensure the smallest possible friction, the conveyor screw 3 should be long and, additionally, heating of the thermoplastic resin from the exterior of the chamber 2 is required. An important property of the present apparatus is that the conveyor screw drive serves only for conveying the thermoplastic resin and not for heating the latter, the preselected temperature of the plasticized thermoplastic resin being nevertheless, reached by approximately selecting the length of the chamber and by providing additional heating surfaces at the end of the chamber, i.e. in the vicinity of the discharge position 8. Preferably, the diameter/length ratio of the conveyor screw is 1:25 to 1:30, with a speed of rotation less than or equal to 120 to 220 rotations per minute and a compression factor of 1:2 to 1:2.5.

The conveyor screw 3 has a core or shaft diameter which increases continuously or stepwise from the inlet 4 to the outlet 6 of the conveyor, to provide a predetermined compression corresponding to the steep pressure increase from the inlet to the outlet, which provides a better expulsion from the thermoplastic resin to the inlet of air enclosed by the plasticizing of the resin.

From the outlet opening 50, the thermoplastic resin leaves, for example, in the form of a film 51 as illustrated in FIG. 2. If the area of the outlet opening 50 and the application speed or the speed with which the applicator 49 is guided over a surface onto which the thermoplastic resin is to be applied are predetermined, then the thickness of the thermoplastic resin layer to be applied is exactly adjustable or regulatable by the control of the volume or mass flow and, thus, the dispensing speed of the thermoplastic resin film from the outlet opening 50 is exactly adjustable and regulatable. For automatic adjustment or regulation of the thickness, a further input 52 can be provided at the microprocessor, in the manner illustrated in FIG. 2, which is connected with a device 53 for determining the speed at which a surface 54, onto which the thermoplastic resin is to be applied, is moved past beneath the applicator 49. In this case, the microprocessor 70 determines, from the two input values, i.e., the speed and the predetermined thickness, the intended value of the volume or mass flow and correspondingly regulates the speed of rotation of the drive motor 13. For a given mass flow, by predetermining a defined dispensing time the dispensing of an exactly defined mass of the thermoplastic resin is also possible.

In intermittent operation, during the dispensing pauses between two thermoplastic resin dispensing phases, the speed of rotation of the drive motor is so adjusted that a return flow of the plasticized thermoplastic resin into the chamber 2 is prevented by the rotation of the conveyor screw 3. In order, however, to also prevent a return flow of the resin from, for example, the applicator 49 and the connecting member 46, a return flow lock, acting as a non-return valve, is provided in the cap 7 or the distributor 47 or at the tip of the screw 3.

Figure 4:
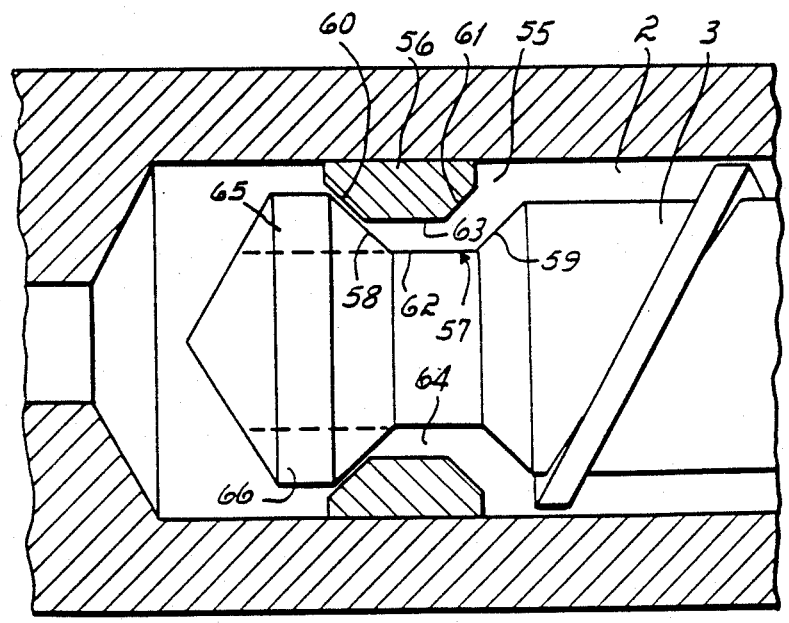
FIG. 4 shows a view taken in cross-section, on an enlarged scale, through a front chamber end provided with a non-return valve.

As shown in FIG. 4, this return flow lock 55 comprises a ring 56, which is mounted so as to be axially displacable within the chamber 2 and which extends radially into an annular groove 57, provided in the periphery of the conveyor screw 3 near its end directed towards the central opening 9. The axial spacing of flanks 58 and 59 of the annular groove 57 is selected so that the ring 56 is axially displacable from a first position shown in FIG. 4, in which one of its shoulders 60 abuts the flank 58 of the annular groove 57, into a second position, in which its other shoulder 61 abuts the second flank 59 of the annular groove 57.

The radial dimension of the ring 56 is selected so that between the bottom 62 of the annular groove 57 and the inner peripheral surface 63 of this ring 56 there is a spacing in the form of an annular passage 64. In the front portion of the conveyor screw 3, between the annular groove 57 and the end directed directed towards the central opening 9, radial slots 65 and 66 are provided which extend radially inwardly from the periphery to a radius corresponding substantially to that of the groove bottom 62.

During the feeding of the thermoplastic resin by the conveyor screw 3, the ring 56 is pressed by the pressure of the thermoplastic resin into the first position, in which it is shown in FIG. 4. In this position, the thermoplastic resin can be fed through the passage 64 and the slots 65 and 66 communicating therewith to the outlet 8 and the central opening 9. If the dispensing of the resin is interrupted, then the thermoplastic resin, due to a pressure drop therein, displaces the ring 36 into it second position, in which the shoulder 61 abuts the flank 59. Thereby the communication of a first region at the interior of the chamber 2 adjoining the central opening 9 with the region of the chamber 2 surrounding the conveyor screw 3 is interrupted and no resin can flow back from the first region into the last-mentioned region, so that a pressure drop in the first-mentioned region and in the adjoining passage extending to the resin outlet opening is avoided.

In another embodiment, the return flow lock can be constructed in the form of a flap, ball or other known return flow preventing device.

The above-described embodiments serve to explain the concepts underlying the invention. However, the invention is not limited to the features of the above-described embodiments, but can be developed e.g. by different combinations of the above-described features. For example, it is possible to combine the pressure regulation in the dispensing pauses with a volume or mass flow regulation during the dispensing pauses, i.e. selectively a volume or mass flow regulation can be superimposed on the pressure regulation or a separate pressure regulation can be effected in the dispensing pauses, a mass flow or volume flow regulation being effected in the dispensing phases. Because of the regulation of the speed of rotation which usually occurs, commercially available disc-rotor motors offer, however, a speed of rotation regulation instead of the volume or mass flow regulation or at least in addition to the volume or mass flow regulation.

The control and regulation of the temperature prevailing within the chamber can if intended be effected by a heating element or a plurality of heating elements arranged at respective sections of the chamber. In the last case, the lengths of the individual heating elements can be the same or different, so that, for example, a predetermined heating temperature curve can be achieved.

The apparatus of the present invention may be utilized for any thermoplastic or viscous material and for various treatment and manufacturing processes such as, for example, extrusion welding or the like.

The embodiments of the invention in which an exclusive property or privilege is claimed are defined as follows:

1. A method for preparing and intermittently dispensing thermoplastic resin such as a hot melt adhesive so that the amount of thermoplastic resin dispensed per unit of time is accurately controlled, said method comprising the steps of:

introducing said thermoplastic resin into an extruder having a chamber, a heating device associated with said chamber, a screw mounted for rotation within said chamber, drive means for effecting the rotation of said screw, an inlet for the supply of resin to said chamber, and an outlet for dispensing said resin from said chamber in a liquid condition;

measuring the pressure within said chamber of said extruder;

measuring the amount of said thermoplastic resin dispensed per unit time;

controlling said drive means utilizing the measured amount of resin dispensed per amount of time to control the speed of rotation of said screw to maintain the amount of resin dispensed per unit of time at a predetermined value of said amount during dispensing of the resin;

maintaining the pressure of the resin within the chamber of the extruder at a predetermined value of said pressure during interruption of the dispensing of the resin; and the speed of rotation of said drive means of said screw being maintained at a first constant value after the predetermined value of the mass or volume of resin dispensed per unit time is reached, and being maintained at a second constant value after a pressure is reached corresponding to second predetermined value during interruption of the dispensing.

* * * * *